United States Patent [19]
Morinigo et al.

[11] Patent Number: 5,354,185
[45] Date of Patent: Oct. 11, 1994

[54] ELECTROMAGNETICALLY ACTUATED RECIPROCATING COMPRESSOR DRIVER

[75] Inventors: Fernando B. Morinigo, Los Angeles; Keith O. Stuart, Cypress, both of Calif.

[73] Assignee: Aura Systems, Inc., El Segundo, Calif.

[21] Appl. No.: 122,694

[22] Filed: Sep. 17, 1993

Related U.S. Application Data

[60] Division of Ser. No. 15,182, Feb. 1, 1993, which is a continuation-in-part of Ser. No. 988,280, Dec. 9, 1992, which is a continuation-in-part of Ser. No. 957,194, Oct. 5, 1992, Pat. No. 5,222,714.

[51] Int. Cl.$^5$ .................................. F04B 17/00
[52] U.S. Cl. .................. 417/410.1; 417/415; 417/416
[58] Field of Search ............ 417/410 R, 415, 416; 335/261, 262, 279, 263, 281, 249; 251/129.16, 129.1

[56] References Cited

U.S. PATENT DOCUMENTS

| | | | |
|---|---|---|---|
| 2,435,817 | 2/1948 | Boynton et al. | |
| 2,934,256 | 4/1960 | Lenning | 417/416 |
| 4,067,667 | 1/1978 | White | 417/416 |
| 4,121,125 | 10/1978 | Dolz | 310/27 |
| 4,614,170 | 9/1986 | Pischinger et al. | 123/251 |
| 4,715,330 | 12/1987 | Buchl | 123/251 |
| 4,719,882 | 1/1988 | Kreuter | 123/251 |
| 4,928,028 | 5/1990 | Leibovich | 310/335 |
| 5,131,624 | 7/1992 | Kreuter et al. | 251/251 |
| 5,222,714 | 6/1993 | Morinigo et al. | 251/129.16 |
| 5,257,915 | 11/1993 | Laskaris et al. | 417/416 |

FOREIGN PATENT DOCUMENTS 197811 11/1978 Austria .
2047006A 10/1980 United Kingdom .

Primary Examiner—Richard A. Bertsch
Assistant Examiner—Alfred Basichas
Attorney, Agent, or Firm—Anthony T. Cascio; Lisa A. Clifford

[57] ABSTRACT

A compressor is disclosed having an electromagnetic actuator for driving the piston in the compression cylinder. The actuator includes an electromagnetic element having a core and a coil. The core has an electromagnet surface and a channel extending through the core. The coil is disposed in the channel. An axially reciprocating armature element is interconnected with the piston. The armature element defines an axial stroke having a stroke midpoint and a stroke peak. The armature element also has an armature surface dimensioned to align with and correspond to the electromagnet surface at the stroke peak. The actuator also includes a primary spring disposed on one end of the armature element for biasing the armature from movement in an axial direction. A secondary spring is disposed on the opposing end of the armature element and biases the armature from movement in an opposite axial direction. The armature is biased by the springs to resonate at a pre-determined frequency. Applying current to the coil in the electromagnetic element when the armature surface passes through the stroke midpoint allows the armature to overcome losses due to friction and compression forces, and causes the armature to continue resonating at the predetermined frequency. Two actuators may be placed back-to-back to create a dual piston compressor.

5 Claims, 3 Drawing Sheets

ELECTROMAGNETICALLY ACTUATED RECIPROCATING COMPRESSOR DRIVER

RELATED APPLICATION DATA

The present application is a divisional of co-pending application Ser. No. 08/015,182, filed on Feb. 1, 1993, which is a continuation-in-part of co-pending application Ser. No. 07/988,280, filed on Dec. 9, 1992, which is a continuation-in-part of co-pending application Ser. No. 07/957,194, filed on Oct. 10, 1992, now U.S. Pat. No. 5,222,714.

FIELD OF THE INVENTION

The present invention relates generally to a driver for an electromagnetically actuated valve, and more particularly to an electromagnetically actuated compressor driver which creates linear reciprocating motion directly.

BACKGROUND OF THE INVENTION

One basic problem with a standard refrigerator compressor is the inefficiency of the compressor due to the friction generated by the piston drive mechanism in the standard compressor. A standard reciprocating refrigerator compressor uses a motor to rotate a crankshaft, which in turn moves a piston up and down within a compression chamber. Referring to FIG. 1, a typical refrigerator compressor 10 is shown. More specifically, the induction motor 12 creates a torque on the crankshaft 14 which causes the piston 16 to move back and forth within the cylinder 18 via a connecting rod 20. During operation, the force exerted by the compressing gas is transferred through the piston's spherical bearing 22 down the connecting rod 20 to the connecting rod bearing 24 and and finally to the crankshaft bearings 26. These bearings are all heavily side loaded, creating a great amount of friction. As a result, the bearings must be continuously lubricated to prevent the heat build-up which will eventually burn out the bearing.

Therefore, a need exists for a compressor driver that provides the required piston movement without producing undesired amounts of friction.

Another problem with the standard compressor is that its manufacturing process is complex, and therefore relatively expensive. The conventional induction motor in the compressor is constructed from a laminated stack of silicon-iron sheets, with a copper coil complexly woven throughout. The motor's stator is assembled by stamping appropriately-shaped individual laminates from a coiled sheet silica-iron. Typically over one hundred individual laminates are required. The laminates are varnished, stacked in a jig, and welded along the side to create one integral unit. Coil slots and holes are machined into the stacked assembly, and plastic insulation inserts are placed in the slots and holes. Copper wire is then woven into the inserts by a complex coil winding machine. The coil extensions are then machine stitched, the entire assembly vacuum impregnated with epoxy, and baked. Similarly, the conventional compressor's rotor assembly requires stacked laminates, wherein the number of laminates and the process of stacking is identical to that required for the stator.

The standard compressor further requires three precision bushings and and a complex spherical bearing. These parts require precision grinding and hardened materials to provide the requisite durability. Therefore, the manufacturing process of the conventional compressor requires extensive equipment and processing, and is therefore a costly process. In comparison, in the compressor of the present invention, the manufacturing process is simple, does not require the above-discussed complex manufacturing process, and only requires precision grinding for the piston and cylinder. Furthermore, the compressor of the present invention uses considerably less copper wire than the typical compressor, and therefore is less expensive in material costs.

Therefore, a need also exists for a compressor that is inexpensive and relatively simple to manufacture.

SUMMARY OF THE INVENTION

Accordingly, it is a primary object of the present invention to overcome one or more disadvantages and limitations of the prior art.

A significant object of the present invention is to provide an electromagnetic compressor valve that operates at a higher efficiency than the prior art compressor valves.

Another object of the present invention is to provide an electromagnetic compressor driver that creates linear piston motion directly.

Another object of the present invention is to provide an electromagnetic compressor driver that eliminates the need for dynamic seals.

Still another object of the present invention is to provide an electromagnetic compressor driver that operates with reduced friction, reduced wear and at a reduced operating temperature than the prior art compressor drivers.

Another object of the present invention is to provide an electromagnetic compressor driver that operates with reduced vibration and noise than the prior art compressor drivers.

It is yet another object of the present invention to provide a compressor that is inexpensive and relatively simple to manufacture.

According to a broad aspect of the present invention, a compressor includes an electromagnetic actuator for driving the piston in the compression cylinder. The actuator includes an electromagnetic element having a core and a coil. The core has an electromagnet surface and a channel extending through the core. The coil is disposed in the channel. An axially reciprocating armature element is interconnected with the piston. The armature element defines an axial stroke having a stroke midpoint and a stroke peak. The armature element also has an armature surface dimensioned to align with and correspond to the electromagnet surface at the stroke peak. The actuator also includes a primary spring disposed on one end of the armature element for biasing the armature from movement in an axial direction. A secondary spring is disposed on the opposing end of the armature element and biases the armature from movement in an opposite axial direction. The armature is biased by the springs to resonate at a pre-determined frequency. Applying current to the coil in the electromagnetic element when the armature surface passes through the stroke midpoint allows the armature to overcome losses due to friction and compression forces, and causes the armature to continue resonating at the predetermined frequency.

A feature of the present invention is that the electromagnetically actuated valve directly produces linear piston movement in the compressor.

Yet another feature of the present invention is that amount of friction produced by the piston movement in the compressor is greatly reduced from the prior art by the use of the electromagnetically actuated driver due to the elimination of side-loaded bearings.

These and other objects, advantages and features of the present invention will become readily apparent to those skilled in the art from a study of the following description of an exemplary preferred embodiment when read in conjunction with the attached drawing and appended claims.

DESCRIPTION OF AN EXEMPLARY PREFERRED EMBODIMENT

Figure 1:
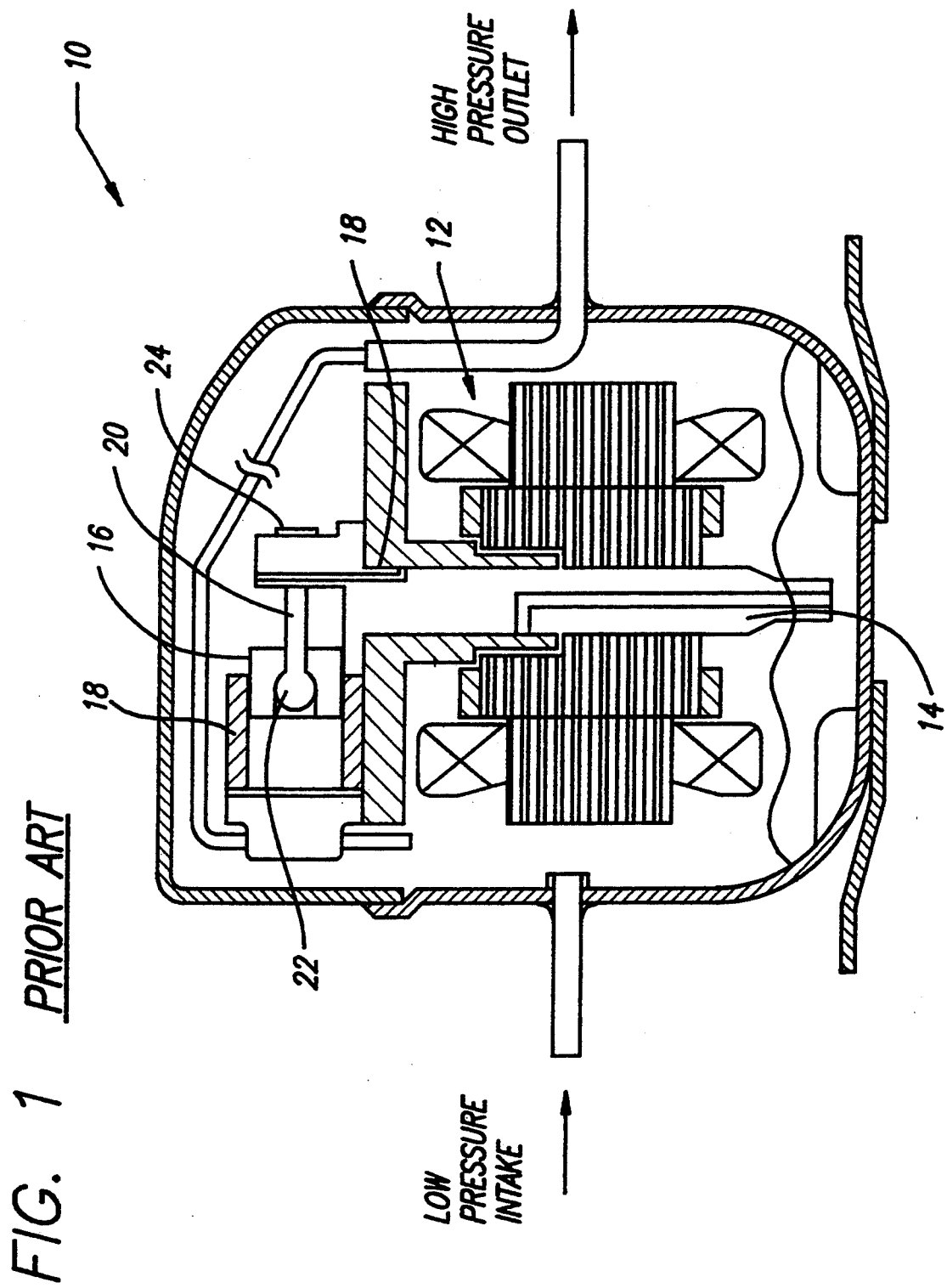
FIG. 1 is a cross-sectional view of a prior art refrigerator compressor valve.
Figure 2:
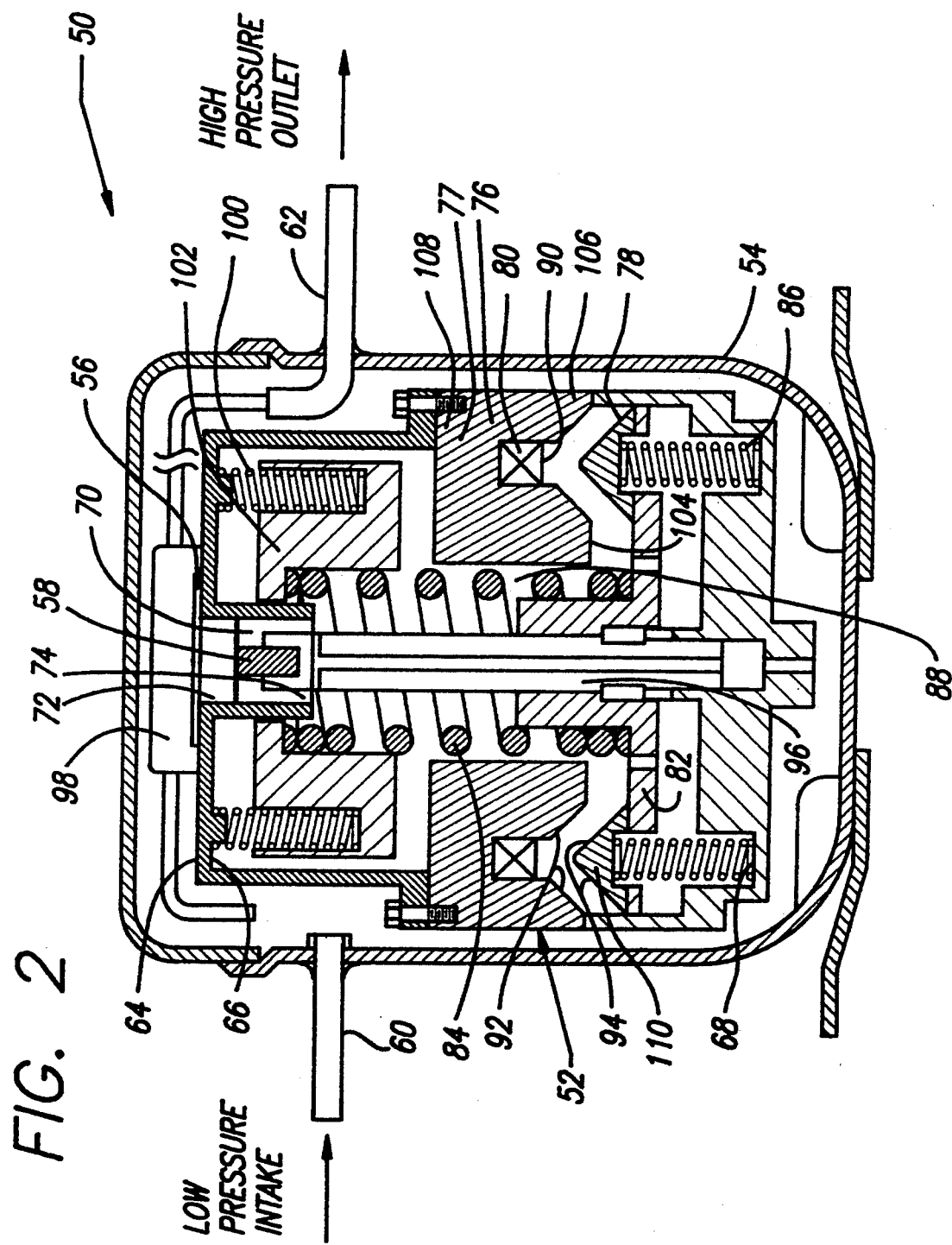
FIG. 2 is a cross-sectional view of one embodiment of the compressor valve of the present invention.

Referring now to FIG. 2, one embodiment of a compressor 50 with an electromagnetically actuated valve driver 52 is shown in cross-section. In the embodiment shown, the compressor 50 includes a compressor containment can 54, a compression cylinder 56, a piston 58, and the electromagnetically actuated driver 52 for controlling the movement of the piston 58 in the compressor 50.

The containment can 54 includes a low pressure intake port 60, a high pressure outlet port 62, and a reed valve 98. The cylinder 56 is disposed within the containment can 54, and includes a cylinder cover 64. The compressor is located between an upper support surface 66 and a lower support surface 68. The upper support surface 66 defines a preferably cylindrical aperture 70, providing a location for the cylinder 56, within which the piston 58 is disposed. The aperture 70 also defines an aperture upper end 72 and an aperture lower end 74, which defines the top and bottom of the cylinder. The electromagnetically actuated valve driver controls the movement of the piston 58 between the upper end 72 and the lower end 74 of the aperture 70.

The electromagnetically actuated valve driver 52 includes an electromagnetic element 76, including a core element 77 and a coil 80, an armature element 78, a retaining bar 82, a valve shaft 96, a support spring 84, and at least one lower spring 86. The core 77 of the electromagnetic element 76 has a first face 104, with an opening at the first face 104 that extends through the core element to define a central chamber 88. The electromagnetic element 76 preferably has annular horizontal cross-section. The first face 104 of the core element 77 further includes a central channel 90 that extends around the central chamber 88.

In an alternative embodiment of the invention, the electromagnetic element 76 may be toroidal-shaped, and extend annularly around the valve shaft 96, or have a substantially U-shaped U-shaped vertical cross-sectional area. The electromagnetic element 76 therefore defines two open polar faces 92 which provide a large electromagnetic pole face area. This alternative configuration is explained in detail in co-owned U.S. patent application Ser. No. 07/957,194, filed on Oct. 5, 1992, now U.S. Pat. No. 5,222,714 which has been incorporated by reference herein.

Referring still to FIG. 2, in the embodiment shown, the central channel 90 has a top portion 106 preferably of a frustroconical cross-section, and a bottom portion 108. The frustrconical top portion defines two polar faces 92 of the electromagnetic element 76 extending from the channel 90, each of the polar faces extending at a pre-selected angle. The armature element 78 also preferably has an annular horizontal cross-section. The armature 78 has a raised portion 110 that is dimensioned to fit in the top portion 106 of the channel 90. The armature raised portion defines two armature pole faces 94, which are at an armature pole face angle corresponding to the pre-selected electromagnet angle. The armature pole faces 94 are angled for maximum contact with the electromagnetic element 76. The angle of the pole faces relative to the stroke motion of the valve serves to minimize the amount of electromagnetic energy required to pull the valve from an open to closed position and compress the gap. The angle of the electromagnetic pole faces 92 and armature pole faces 94 are also selected so as to provide a polar surface that provides adequate electromagnetic force to match the force that is exerted by compressing gas on the piston during the compression cycle. The process of calculating the required values for the angles of the polar faces and other dimensions is explained in detail in co-owned U.S. patent application Ser. No. 07/957,194, filed on Oct. 5, 1992, now U.S. Pat. No. 5,222,714, which is incorporated by reference herein. More specifically, the shape of the electromagnetic face 92 and aperture face 94 define the electromagnets force to gap relationship. As the angle of the electromagnetic face in relation to the horizontal axis increases, the wider the gap is through which the aperture face can be attracted to the electromagnet. For a compressor application, the face is shaped such that the force applied by the electromagnet matches closely to the force exerted by the gas compressing onto the piston.

The coil 80 extends within the bottom portion 108 of the central channel of the electromagnetic element and is bonded to the electromagnetic element. The central location of the coil element and the cross-sectional shape of the electromagnetic element provides maximized magnetomotive force with minimal resistance. The valve shaft 96 is disposed within the central chamber 88 of the electromagnetic element 76. The piston 58 is connected to one end of said shaft 96. The retaining bar 82 connects the armature element 78 to the valve shaft 96. Therefore, the piston 58, valve shaft 96, and armature element 78 combine to form a moving assembly.

The support spring 84 is disposed within the central chamber 88 of the electromagnetic element 76 and extends from the retaining bar 82 to the upper support 66. Therefore, the support spring 84 restrains the armature 78 from upper movement. In the embodiment shown, two lower springs 86 extend from the armature element 78 or retaining bar 82 to the lower support surface 68 of the cylinder 56. The lower springs restrain the armature 78 from downward movement.

Referring still to FIG. 2, the operation of the compressor 50 will be described. The support spring 84 and lower springs 86 bias the armature in its initial spaced apart position from the electromagnetic element. In order to raise the piston 58 to the upper end 72 of the aperture 70, the electromagnet 76 is energized by applying current to the coil 80, creating an electromagnetic field. The electromagnetic field attracts the armature 78 towards the electromagnet 76. Because the armature 78 is attached to the piston 58 via the retaining bar 82 and shaft 96, the movement of the armature 78 towards the electromagnet 76 moves the piston 58 in the aperture 70 toward the aperture upper end 72. The upward movement of the armature 78 also causes the compression of the support spring 84, thereby storing energy in the support spring 84.

When the moving assembly, consisting of the piston, shaft, and armature reaches the uppermost position in the aperture 70, the current in the coil 80 is interrupted, and the moving assembly is forced downward by the compressed support spring 84. The momentum of the moving assembly causes it to drive past its center position, compressing the lower spring 86. The lower springs 86 therefore slows and eventually stops the downward movement of the moving assembly. As the piston is moving downward, refrigeration gas is drawn into the compression chamber through the intake valve 60 and reed valve assembly 98.

After the lower springs 86 stop the downward movement of the moving assembly, the compressed lower springs 86 drive the moving assembly upward, past its center point and toward the top of its stroke. As the piston 58 moves upward in the aperture 70 the pressure increase in the compression chamber causes the intake valve to close, and the compression of the gas begins. As the piston begins to move from its bottom position, the amount of force required to compress the gas is low. However, as the piston moves upward in the compression cylinder, the amount of force required increases, and it therefore becomes necessary to apply an external force in order to drive the piston to its uppermost position. The external force is applied by energizing the electromagnet 76, as described above. The size and shape of the electromagnet is designed such that the amount of electromagnetic force generated matches the restricting force generated by the compressed gas, so as to allow the piston to reach its uppermost position. Once the piston reaches its uppermost position, the current to the coil element is interrupted, the moving assembly is driven downward by the compressed support spring 84, and the cycle is repeated.

An addition feature of the present invention is the vibration cancellation system of the compressor. As shown in FIG. 2, the compressor includes two upper springs 100 and a spring mounted reaction mass 102. The compression and extension of the support spring 84 drives the reaction mass 102 180 degrees out-of phase with the moving assembly. The matching of the weight of the reaction mass 102 to the weight of the moving assembly causes the natural and nearly complete cancellation of rectilinear vibrations. Any remaining small amounts of vibration eliminated by mounting the compressor assembly to springs within the housing, and rubber-mounting the entire compressor unit to the refrigerator frame.

In order to create a two-stage compressor, the separate compressors may be mounted back-to-back such that the vibration created by one moving mass is cancelled by the other moving mass. With this two-stage compressor configuration, a reaction mass is not required.

It should be noted that in an alternative embodiment of the invention, more than one electromagnetic element and armature element may be used. The use of multiple electromagnetic element and armature pairs is significant in that it reduces the mass required to complete the magnetic circuit, without reducing the area allocated for the flux. Therefore, although the current and power requirements will increase with multiple electromagnet pairs and armatures, the total current and power requirement remains desirably manageable.

Figure 3:
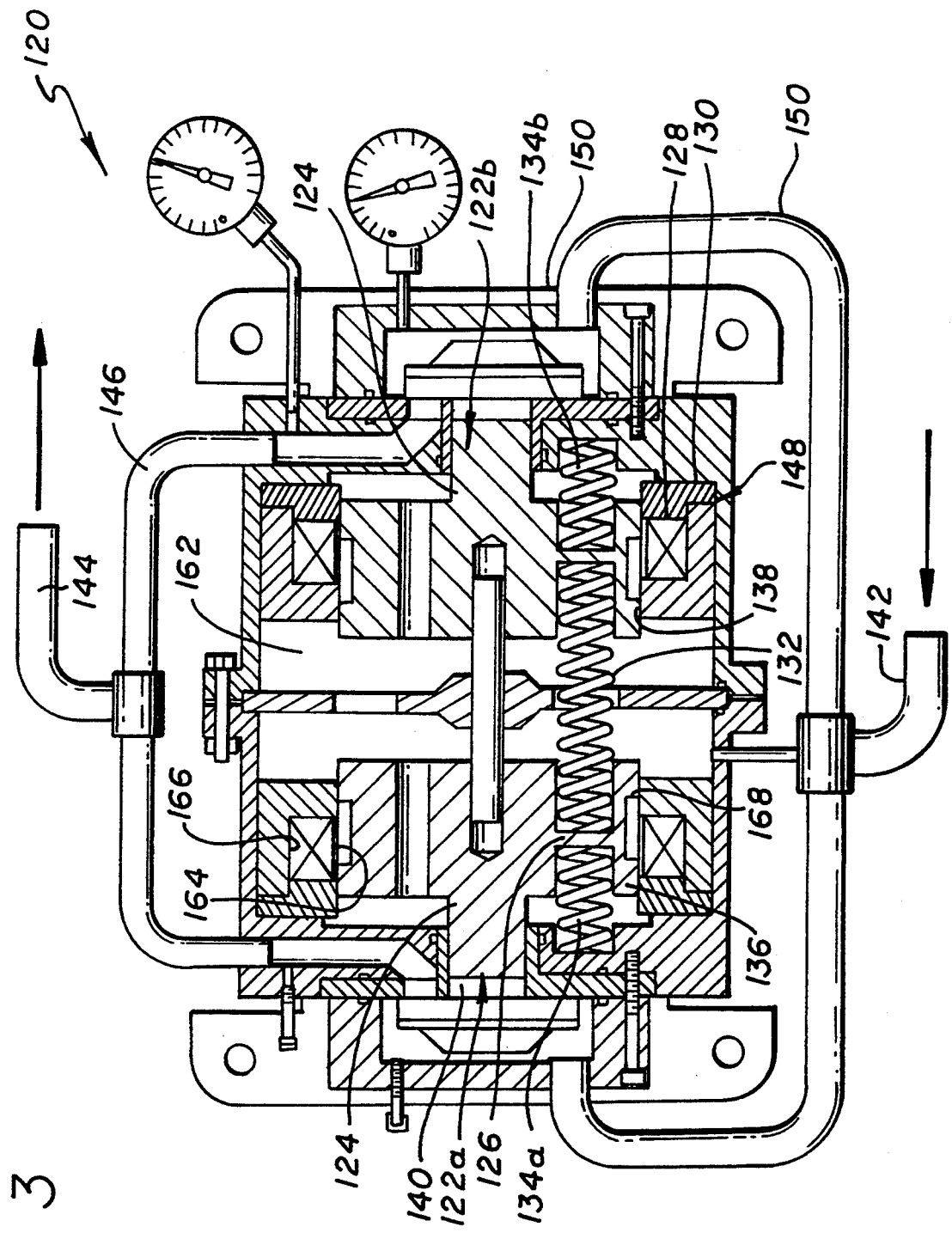
FIG. 3 is an alternative embodiment of the compressor valve and driver of the present invention.

Referring now to FIG. 3, a second embodiment 120 of the compressor valve driver of the present invention is shown. The compressor shown in FIG. 3 utilizes two identical piston drive assemblies or actuators 122, which will be described in more detailed herein.

Each of the piston drive assemblies 122 includes a piston 124, a driver portion 126, a primary spring 132, a secondary spring 134, and an electromagnetic element 148, comprising an electromagnetic coil 128 and an electromagnet core 130. The core 130 has an electromagnet surface or face 138 with an opening 164 in the electromagnet surf 138 extending through the core 130. The opening 164 defines a channel 166. The coil 128 is disposed in the channel 166.

In the embodiment shown, the piston 124 and driver portion 126 are formed as a single assembly of solid low-carbon steel. The piston is preferably precision machined to in order to provide close tolerance with the cylinder walls. The close tolerance serves to minimize gas leaks around the piston during compression (referred to as blow-by) during the compression stage. The driver portion 126 is positioned towards the rear end of the piston drive assembly 122, and includes an armature 168 having an armature face 136. The armature 168 forms a magnetic circuit with the electromagnetic coil 128 and electromagnet 130. The armature face 136 and the electromagnet face 138 are dimensioned to correspond and align with each other at the upper limit of the armature's stroke. As shown in FIG. 3, the armature 168 and the electromagnetic element 148 are annular in cross-section.

In its initial at rest position, the piston drive assembly 122 is biased between the primary spring 132 and the secondary spring 134 at the midpoint of the piston's travel. When the compressor is operating, the piston drive assembly 122 reciprocates at the natural frequency as determined by the stiffness of the springs 132,134 and the mass of the piston drive assembly 122. The electromagnetic circuit maintains the periodic motion by energizing the coil 128 and thereby accelerating the piston drive assembly 122 each time it passes through its midpoint during its compression stroke.

Still referring to FIG. 3, the operating principle of the piston drive assembly is explained. As the electromagnetic coil 128 is energized, magnetic flux lines are generated. An axial force is generated between the electromagnet 130 and drive assembly 126 as flux attempts to create a minimum reluctance path. In the embodiment shown, the minimum reluctance path is achieved when the electromagnet face 138 directly aligns with the armature face 136. In the embodiment shown, the electromagnetic face 138 radially faces and axially aligns with the armature face at the upper limit or peak of the armature's stroke. At this point, the axial force drops to zero.

If the current in the electromagnetic coil 128 is applied at the same frequency as the natural mass spring resonance of the of the piston drive assembly 122 supported between the springs 132, 134, the piston assumes a natural harmonic motion.

During the intake stroke of the piston 124, gas is drawn into a compression chamber 140, and the secondary spring 134 is compressed. At the bottom limit of the stroke, the energy stored in the secondary spring 134 drives the piston 124 forward, creating positive pressure in the in the compression chamber 140, which, in turn, closes an intake valve 144. As the gas is compressing during the forward stroke of the piston 124, it caused an increased resistance to the piston's motion as the volume of the compression chamber 140 decreases. The resistance represents the amount of work performed on the gas during the compression cycle. If no external energy was applied to compensate for the work performed on the gas, the piston's motion would quickly die out. However, because the electromagnetic coil 128 is energized as the piston 124 moves forward in its compression stroke and as the armature passes through the stroke midpoint, the electromagnetic energy compensates for the compressed gas resistance and the friction resistance and maintains the piston's harmonic motion. Once the pressure inside the compression chamber is greater than the high pressure exhaust, an exhaust valve 144 opens, and the gas is pumped out of the compression chamber 140 into the exhaust manifold 146.

The energy transferred from the electromagnet 130 to the piston's motion is a function of the force applied by the electromagnet 130 and the speed at which the piston is moving when that force is applied. The orientation of the electromagnet 130 in relation to the piston driver portion 126 and armature face 136 allows the maximum force exerted by the electromagnet 130 to correspond to the point of maximum piston velocity. Therefore, the energy transferred for a given amount of current in the coil 128 is maximized, and the level of current required to replace the energy lost to the gas during compression is minimized. Because the power dissipated in the coil 128 is proportional to the square of the current, ($I^2R$), lowering the current greatly lowers the dissipated power, which dramatically improves efficiency.

In order to simplify the electronics required for the electromagnetically actuated driver 120, the mass/spring resonance of the piston drive assembly 122 is preferably set to the frequency of the power line voltage, which is typically 60 Hz. Due to the weight of the piston drive assembly 122 and the stiffness of the springs 132, 134, inertial vibration is is produced by the piston drive assembly 122 as it resonates. In order to eliminate this vibration, two identical piston drive assemblies 122a, 122b are mounted back-to-back, as described previously herein. The two piston drive assemblies 122a, 122b, share a common primary spring 132 which biases the piston drive assemblies 122a, 122b in opposing directions. The two secondary springs, 134a, 134b, each bias one of the piston drive assemblies in an opposite direction as the secondary spring. The two piston drive assemblies 122a, 122b, are driven with identical signals. Therefore, the compressor unit shown in FIG. 3 consists of dual pistons moving 180 degrees out of phase with each other. If the intake valve 142 and exhaust valve 144 are connected as shown in FIG. 3, the dual piston compressor acts as a single compressor stage, which delivers twice the flow as a single piston. The dual pistons may also be connected wherein the output of one piston becomes the input for another piston, creating a two stage compressor. In the two stage compressor, the volume of the compression cylinders are adjusted so that the amount of compression achieved by each stage is identical, which balances the forces to achieve vibration cancellation.

Another feature of the compressor shown in FIG. 3 is the elimination of dynamic seals. As shown in FIG. 3, the gas intake flows directly into the intake manifold 150 that surrounds the two piston drive assemblies 122a, 122b. During the piston's intake cycle gas is drawn into the compression chamber 140 from the intake manifold 150. During the compression cycle, the intake valve 142 is closed and the gas is pushed out through the exhaust valve 144 into the exhaust manifold 146. If a small amount of gas leaks around the piston during compression (referred to as blow-by) the gas will leak into a central area 162 between the reciprocating piston driver assemblies 122a, 122b, through a vent line 164, and into the intake valve manifold assembly 150, Therefore, even if blow-by occurs, the gas is recirculated back into the intake of the compressor.

In the embodiment shown in FIG. 3, the compressor operates in an oil bath, wherein the motion of the reciprocating pistons circulates the lubricant to the bearing and piston sleeve surfaces. The lubricant further serves to transfer internal heat to the finned compressor case.

There has been described hereinabove an exemplary preferred embodiment of the actuator according to the principles of the present invention. Those skilled in the art may now make numerous uses of, and departures from, the above-described embodiments without departing from the inventive concepts disclosed herein. Accordingly, the present invention is to be defined solely by the scope of the following claims.

We claim as our invention:

1. A dual piston compressor having two compression cylinders at opposing ends of said compressor, each cylinder defining an aperture and having a piston disposed within the aperture for axial movement between an upper end of the aperture and a lower end of the aperture, said compressor comprising:
 a first and a second electromagnetic actuator for driving each of the pistons, said first and second actuators each further comprising;
  an electromagnetic element, said electromagnetic element including a core and a coil, said core having an electromagnet surface and an opening at said electromagnet surface extending through said core, said opening defining a channel, said coil being disposed in said channel; and
  an axially reciprocating armature element interconnected with each of said pistons, said armature element defining an axial stroke having a stroke midpoint, and further having an armature surface dimensioned to align with and correspond to said electromagnet surface;
 a primary biasing element for biasing the armature element of both the first and second actuator in opposing axial directions; and
 two secondary biasing elements, each of said secondary biasing elements biasing one of the first and second actuators in an opposing axial direction from the primary biasing element;
 wherein said first and second actuators are biased to resonate at a pre-determined frequency 180 degrees out of phase from each other, and further wherein applying current to the coil in the electromagnetic element when the armature passes through the stroke midpoint accelerates the armature surface, allowing the armature surface to overcome frictional and compression forces, and causing the armature surface to continue resonating at the pre-determined frequency.

2. A compressor in accordance with claim 1 wherein the axial stroke of said armature element further defines a stroke peak, and further wherein said armature surface and said electromagnet surface are aligned at the stroke peak.

3. A compressor in accordance with claim 1 wherein said electromagnetic element and said armatures are annular in cross-section.

4. A compressor in accordance with claim 1 wherein said compressor further comprises a common intake valve assembly and a common exhaust assembly said intake and exhaust assemblies being connected to the two compression cylinders.

5. A compressor in accordance with claim 4 wherein said compressor further includes a central area disposed intermediate the first and second actuators, and further wherein said central area includes a vent line to said intake valve assembly.

* * * * *